Jan. 5, 1943.  W. LEATHERS  2,307,520
ELECTRICAL TAKE OFF DEVICE FOR METERS
Filed Aug. 2, 1940
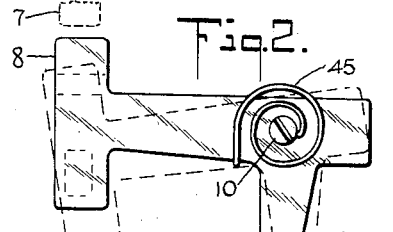
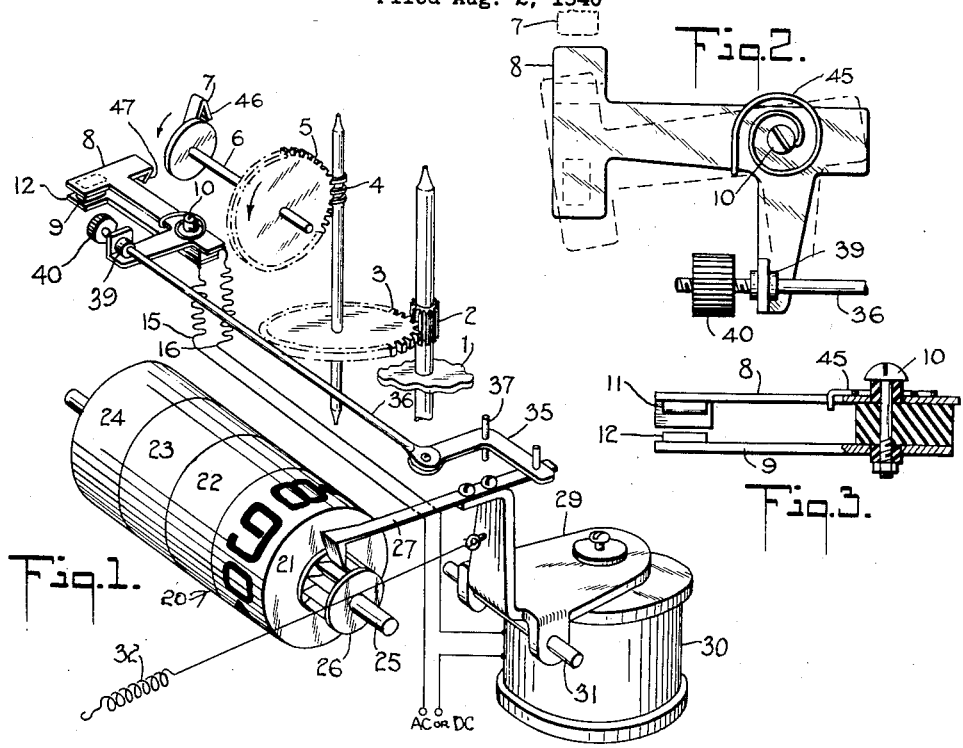
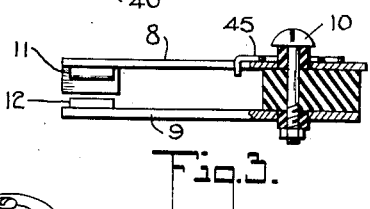
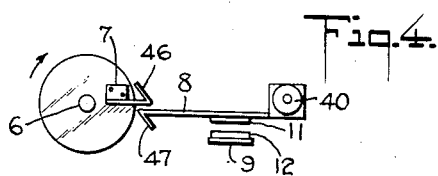
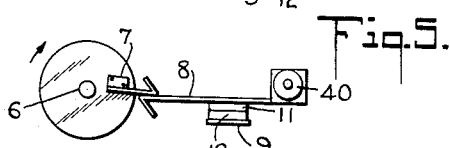
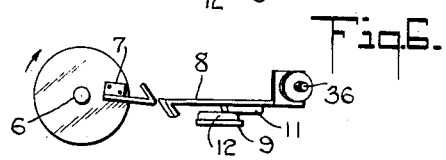
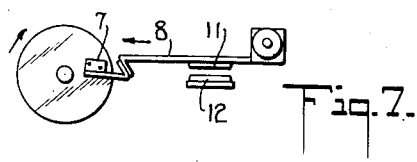
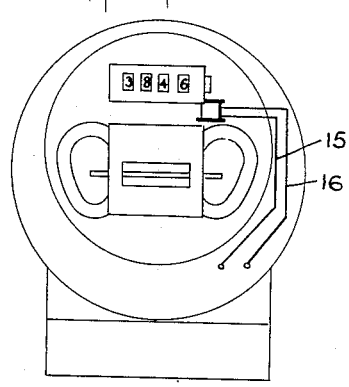
INVENTOR
W. Leathers Patented Jan. 5, 1943

2,307,520

UNITED STATES PATENT OFFICE 2,307,520

ELECTRICAL TAKE-OFF DEVICE FOR METERS

Ward Leathers, Brooklyn, N. Y., assignor, by mesne assignments, to International Business Machines Corporation Application August 2, 1940, Serial No. 349,977

11 Claims. (Cl. 175—373)

This invention pertains to electric meters, and more particularly to the means whereby the consumed current may be registered on a counting or cyclometer mechanism.

Step-by-step cyclometer mechanisms require more energy for their actuation than the older type of rotating disc indicators. The disc indicators, however, did not show full digit figures at the several positions of units, tens, hundreds, thousands. They generally turned two discs clockwise and two counter-clockwise and were practically unreadable to the average consumer. Cyclometer registers, as heretofore applied to electric meters, have given step-by-step figures for the digits representing tens, hundreds, thousands, but units figures have invariably been turned progressively. The reason for this lies in the fact that such cyclometer registers when applied to electric meters, and driven by the armature-disc of the meter, must be built to function with the smallest mechanical effort. Although such cyclometer registers have been built to operate with extremely small effort they still furnish a measurable resistance to the free indication of the total consumed current.

An object of the present invention is to provide means whereby units as well as tens, hundreds, thousands digits may be turned step-by-step without resistance to the free indication of the total consumed current.

An object of the invention is to actuate the recording indices from an auxiliary power source removing all necessity for the performance of work by the measuring mechanism of the meter.

An object of the invention is to control the use of the auxiliary power that actuates the recording mechanism with the least possible resistance to the free indication of the total consumed current and the recovery of the energy required for control so that there can be no failure to record the full measure of the consumed current.

A further object of the invention is to reduce the actual work-effort on the part of the metering mechanism to an irreducible minimum consisting only of making a sensitive electric contact and then reclaiming that effort from an auxiliary source of power.

Further objects will appear as the invention is better understood.

In order to make my invention clear and understandable, I have prepared the following specification, to which I have appended a drawing, of which—

Figure 1 is a perspective view, diagrammatic in its representation, of a cyclometer-indicator, electric-contacts, and auxiliary cyclometer-drive.

Figure 2 shows essential parts of the contacting mechanism in plan view.

Figure 3 is the same in partially sectioned elevation.

Figures 4, 5, 6 and 7 are diagrammatic views showing the progressive stages in the current make-and-break, and energy-recovery mechanism.

Figure 8 shows diagrammatically the front face of an electric meter with cyclometer mechanism and auxiliary source of power.

An armature-disc 1 of an electric meter is normally carried on a vertical shaft having integral with it a gear 2 meshing with a larger gear 3. The gears 2 and 3 in some makes of meters are worm and worm-gear instead of the spur and pinion shown. Further speed reduction is obtained from the shaft of the gear 3 by means of a worm 4 and worm-gear 5, while the shaft 6 of the gear 5 is provided with a rotating projection or cam finger 7 for the purpose of closing an electric circuit once with each revolution of the shaft 6, as will hereafter be made clear. A speed reduction from the disc 1 to the shaft 6 is such that the shaft makes one revolution for each kilowatt hour of current consumed. Two spring impact member 8 and spring arm 9 (more fully shown in Figures 2 and 3) are supported by a screw 10 joined to a suitable portion of the meter frame. The member 8 is rotatable about the screw 10 while the arm 9 insulated from 8 is rigidly supported by the same means. Electric contract points 11 on member 8, and 12 on arm 9, are devised to close a circuit including the conductors 15 and 16 when the member 8 interrupts the rotating arm 7 which forces the contact points 11 and 12 together. As stated, the circuit through the conductors 15—16 is closed with each revolution of the shaft 6 which is once for each kilowatt hour of consumed current. A barrel type counter or cyclometer 20 of conventional design insofar that when the units wheel 21 has made a full revolution the tens wheel 22 makes $\frac{1}{10}$ revolution and the same ratio is maintained from wheel to wheel as tens steps up hundreds wheel 23 with each revolution, and hundreds wheel 23 steps up thousands wheel 24. Such mechanisms are of several types of design in such universal use as not to require further description here. One type is found in all automobile speedometers. The barrels 21 to 24 are freely mounted on the shaft 25 which is supported in bearings held in suitable manner in the meter frame. Units barrel 21 is integrally joined to a driving ratchet 26 turned by a pawl 27. The pawl is operated the distance of one tooth at a time by an armature 29 moved by a coil 30 about a fulcrum 31 again supported in suitable manner in the meter frame. A spring 32 returns the pawl and armature when the coil 30 is demagnetized. A bell crank 35 hinged to the spring pawl 27 and to a rod 36 is hingedly mounted at 37 and supported in suitable manner by the meter frame. The rod 36 is joined to the member 8 by means of an electrical insulation 39 and made of adjustable length by means of a thumbnut 40.

When the contact arm 7 impinges on the member 8 and continues in its rotary path it depresses member 8 until contacts 11—12 establish a circuit through 15—16 which supply current to the coil 30 from a source marked "Load" in the meter. When the coil 30 is energized, the armature 29 by means of the pawl 27 turns up one figure on the cyclometer barrel at the same time it pulls on the rod 36 by means of the bell crank lever 35. When the rod 36 is pulled a sufficient distance the member 8 is rotated sufficiently about the screw 10 (as shown by the dotted line in Figure 2) to withdraw the member 8 from under the rotating arm 7, at which moment it springs upward from its own spring energy, breaking the circuit at the contact points 11—12, and thus deenergizing the coil 30. The spring 32 then returns the armature and pawl to normal position and releases the tension on the rod 36. Since the adjusting nut 40 is not normally in contact with the member 8 an adjustable spring 45 may be finely adjusted for rotating the member 8 back toward its normal position with whatever degree of energy is required, for the following purpose:

The purpose of rotating the member 8 by means of the rod 36 and of returning it to its normal position under a finely adjustable tension as at 45 is to return to the metering mechanism 1 to 7 the exact amount of energy it dissipated in pressing the member 8 down to make contact by means of the rotating arm 7. The object of this power recovery is that the meter shall record the full amount of current consumed and that thereby the public utility corporation may be paid in full measure for its current. The exact mechanical method of obtaining this recovery may be varied, but I have shown, for purposes of illustration, in diagrams (see Figures 4, 5, 6 and 7) a method comprising reentrant flanges, 46 on arm 7 and 47 on member 8. The diagrams show four positions. In Figure 4 the arm 7 is about to contact the member 8. In Figure 5 the rotating arm 7 has depressed the member 8 and electric contact is established between 11 and 12. In Figure 6, the rod 36 has rotated the member 8 until it is drawn out from under the rotating arm 7. It then springs upward of its own volition at which point the circuit is broken and the spring 45, as in Figure 7, puts the reentrant flanges together with a predetermined and calibrated pressure for the purpose of urging forward the armature-disc 1 and of obtaining the recovery of whatever energy loss has been sustained through the resistance to rotation caused by impact member 8 interrupting the free rotation of arm 7.

While the embodiment in my invention herewith described has set forth the meter registering armature of an electric meter as the primary source of actuation and the registering of consumed electric current as the primary objective, it is important to note that where the initial source of actuation is in a gas, water or steam meter the gear reduction elements are devised to deliver to the gear 5 one revolution for each unit of consumed commodity. Thus, where an application of this invention is made to other than electric meters a local source of electric current must be provided for its actuation. However, it will then record units of any desired commodity.

What is claimed is:

1. The combination with a rotating shaft, of a cam finger secured to said shaft and projecting outwardly therefrom, a contact arm movable generally inwardly and outwardly toward and away from the shaft respectively and, when in its innermost position occupying a position in the path of movement of said finger and designed to be periodically engaged by the latter upon rotation of the shaft and to be deflected thereby, means yieldingly maintaining the arm in its innermost position, a stationary contact normally out of engagement with said arm and designed for cooperative engagement with the arm upon deflection of the latter, an electric circuit adapted to be closed by engagement of said contact and arm, means supplying current to the circuit, a solenoid in said circuit, means connecting the solenoid and arm for withdrawing the latter out of the path of the rotating finger upon closing of the circuit whereby said yielding means will restore the arm to its non-deflected position and said former yielding means will project the arm inwardly, and cooperating impact means on the arm and finger for impelling the finger forwardly in its normal path of rotation upon projection of the arm inwardly by said former yielding means.

2. The combination with a rotating shaft, of a cam finger secured to said shaft and projecting outwardly therefrom, a contact arm movable generally inwardly and outwardly toward and away from the shaft respectively and, when in its innermost position occupying a position in the path of movement of said finger and designed to be periodically engaged by the latter upon rotation of the shaft and to be deflected thereby, means yieldingly maintaining the arm in its innermost position, a stationary contact normally out of engagement with said arm and designed for cooperative engagement with the arm upon deflection of the latter, an electric circuit adapted to be closed by engagement of said contact and arm, means supplying current to the circuit, a solenoid in said circuit, means connecting the solenoid and arm for withdrawing the latter out of the path of the rotating finger upon closing of the circuit whereby said yielding means will restore the arm to its non-deflected position and said former yielding means will project the arm inwardly, and cooperating impact cam surfaces on the finger and arm designed for camming engagement to impel the finger forwardly in its normal path of rotation upon projection of the arm inwardly.

3. The combination with a rotating shaft, of a cam finger secured to said shaft and projecting outwardly therefrom, a contact arm movable generally inwardly and outwardly toward and away from the shaft respectively and, when in its innermost position, occupying a position in the path of movement of said finger and designed to be periodically engaged by the latter upon rotation of the shaft and to be deflected thereby, means yieldingly maintaining the arm in its innermost position, an electric circuit, means for supplying current to said circuit, a pair of normally open cooperating contacts adapted to be closed upon deflection of the arm by said finger, a solenoid in said circuit, means connecting the solenoid and arm for withdrawing the latter out of the path of the rotating finger upon closing of the contacts whereby said contacts become open and said yielding means will project the arm inwardly, and cooperating impact means on the arm and finger for impelling the latter forwardly in its normal path of rotation upon projection of the arm inwardly.

4. The combination with a rotating shaft, of a cam finger secured to said shaft and projecting outwardly therefrom, a contact arm movable generally inwardly and outwardly toward and away from the shaft respectively and, when in its innermost position, occupying a position in the path of movement of said finger and designed to be periodically engaged by the latter upon rotation of the shaft and to be deflected thereby, means yieldingly maintaining the arm in its innermost position, an electric circuit, means for supplying current to said circuit, a pair of normally open cooperating contacts adapted to be closed upon deflection of the arm by said finger, a solenoid in said circuit, means connecting the solenoid and arm for withdrawing the latter out of the path of the rotating finger upon closing of the contacts whereby said contacts become open and said yielding means will project the arm inwardly, and cooperating impact cam surfaces on the finger and arm designed for camming engagement to impel the finger forwardly in its normal path of rotation upon projection of the arm inwardly.

5. The combination with a rotating shaft, of a cam finger secured to said shaft and projecting outwardly therefrom, a contact arm movable generally inwardly and outwardly toward and away from the shaft respectively and, when in its innermost position, occupying a position in the path of movement of said finger and designed to be periodically engaged by the latter upon rotation of the shaft and to be deflected thereby, spring means yieldingly maintaining the arm in its innermost position, means for adjusting the tension of said spring means, a stationary contact normally out of engagement with said arm and designed for cooperative engagement therewith upon deflection of the latter, means yieldingly maintaining the arm out of engagement with the contact, an electric circuit adapted to be closed by engagement of said contact and arm, means supplying current to the circuit, a solenoid in said circuit, means connecting the solenoid and arm for withdrawing the latter out of the path of the rotating finger upon closing of the circuit whereby said yielding means will restore the arm to its non-deflected position and said spring means will project the arm inwardly, and cooperating impact means on the arm and finger for impelling the finger forwardly in its normal path of rotation upon projection of the arm inwardly by said spring means.

6. The combination with a rotating shaft, of a cam finger secured to said shaft and projecting outwardly therefrom, a contact arm movable generally inwardly and outwardly toward and away from the shaft respectively and, when in its innermost position, occupying a position in the path of movement of said finger and designed to be periodically engaged by the latter upon rotation of the shaft and to be deflected thereby, spring means yieldingly maintaining the arm in its innermost position, means for adjusting the tension of said spring means, a stationary contact normally out of engagement with said arm and designed for cooperative engagement therewith upon deflection of the latter, means yieldingly maintaining the arm out of engagement with the contact, an electric circuit adapted to be closed by engagement of said contact and arm, means supplying current to the circuit, a solenoid in said circuit, means connecting the solenoid and arm for withdrawing the latter out of the path of the rotating finger upon closing of the circuit whereby said yielding means will restore the arm to its non-deflected position and said spring means will project the arm inwardly, and cooperating impact cam surfaces on the finger and arm designed for camming engagement to impel the finger forwardly in its normal path of rotation upon projection of the arm inwardly.

7. The combination with a rotating shaft, of a disk mounted on the shaft and rotatable with the latter, a radially extending finger projecting outwardly from the disk, a contact arm positioned adjacent the disk and movable toward and away therefrom from an outer position to an inner position wherein the arm is in the path of movement of said finger and is adapted to be engaged and deflected thereby, means yieldingly maintaining the arm in its inner position, a contact normally out of engagement with said arm and designed to be engaged thereby when the latter is deflected, an electric circuit adapted to be closed by engagement of the contact and arm, means supplying current to the circuit, means operable upon closing of the circuit for withdrawing the arm out of the path of movement of the rotating finger whereby said latter yielding means will restore the arm to its non-deflected position and said former yielding means will project the arm inwardly, and cooperating impact means on the arm and finger for impelling the finger forwardly in its normal path of rotation upon projection of the arm inwardly.

8. The combination with a rotating shaft, of a disk mounted on the shaft and rotatable with the latter, a radially extending finger projecting outwardly from the disk, a contact arm positioned adjacent the disk and movable toward and away therefrom from an outer position to an inner position wherein the arm is in the path of movement of said finger and is adapted to be engaged and deflected thereby, means yieldingly maintaining the arm in its inner position, a contact normally out of engagement with said arm and designed to be engaged thereby when the latter is deflected, an electric circuit adapted to be closed by engagement of the contact and arm, means supplying current to the circuit, means operable upon closing of the circuit for withdrawing the arm out of the path of movement of the rotating finger whereby said latter yielding means will restore the arm to its non-deflected position and said former yielding means will project the arm inwardly, and cooperating impact cam surfaces on the finger and arm designed for camming engagement to impel the finger forwardly in its normal path of rotation upon projection of the arm inwardly.

9. The combination with a rotating shaft, of a disk mounted on the shaft and rotatable with the latter, a radially extending finger projecting outwardly from the disk, a contact arm positioned adjacent the disk and movable toward and away therefrom from an outer position to an inner position wherein the arm is in the path of movement of said finger and is adapted to be engaged and deflected thereby, spring means yieldingly maintaining the arm in its innermost position, means for adjusting the tension of said spring means, a contact normally out of engagement with the arm and designed to be engaged by the latter when the same is deflected, means yieldingly maintaining the arm out of engagement with the contact, an electric circuit adapted to be closed by engagement of the contact and arm, means supplying current to the circuit, means operable upon closing of the circuit for withdrawing the arm out of the path of movement of the rotating finger whereby said yielding means will restore the arm to its non-deflected position and said spring means will project the arm inwardly, and cooperating impact means on the arm and finger for impelling the latter forwardly in its normal path of rotation upon projection of the arm inwardly by said spring means.

10. The combination with a rotating shaft, of a disk mounted on the shaft and rotatable with the latter, a radially extending finger projecting outwardly from the disk, a contact arm positioned adjacent the disk and movable toward and away therefrom from an outer position to an inner position wherein the arm is in the path of movement of said finger and is adapted to be engaged and deflected thereby, spring means yieldingly maintaining the arm in its innermost position, means for adjusting the tension of said spring means, a contact normally out of engagement with the arm and designed to be engaged by the latter when the same is deflected, means yieldingly maintaining the arm out of engagement with the contact, an electric circuit adapted to be closed by engagement of the contact and arm, means supplying current to the circuit, means operable upon closing of the circuit for withdrawing the arm out of the path of movement of the rotating finger whereby said yielding means will restore the arm to its non-deflected position and said spring means will project the arm inwardly, and cooperating impact cam surfaces on the finger and arm designed for camming engagement to impel the finger forwardly in its normal path of rotation upon projection of the arm inwardly.

11. The combination with a rotating shaft, of a contact finger secured to the shaft and projecting outwardly therefrom, a contact member movable generally inwardly and outwardly toward and away from the shaft respectively and, when in its innermost position occupying a position in the path of movement of said finger and designed to be periodically engaged by the latter upon rotation of the shaft and to be deflected thereby, means normally maintaining the arm in its innermost position, a stationary contact normally out of engagement with said contact member and designed for cooperative engagement with the latter upon deflection thereof, an electric circuit adapted to be closed by engagement of said contact and contact member, means supplying current to the circuit, a solenoid in the circuit, and means connecting the solenoid and contact member for withdrawing the latter out of the path of the rotating finger upon closing of the circuit.

WARD LEATHERS.